7782X
B. F. Adams.
Steering.
No. 0
Patented Nov. 19, 1833.
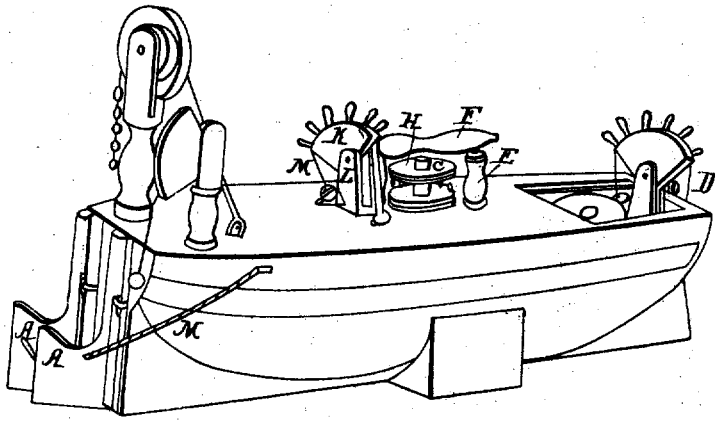
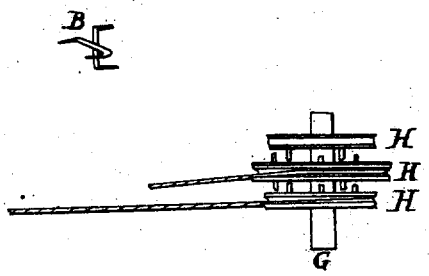
N. PETERS, PHOTO-LITHOGRAPHER, WASHINGTON, D. C.

7782 X

No. 10

Nov. 19, 1833

Benjamin Franklin Adams
Letters Patent

The Schedule referred to in these Letters Patent and mak-
ing part of the same containing a description in the words of
the said Benjamin Franklin Adams himself of his
improvement being an apparatus for steering vessels called
Adams' Steering Horizontal Quadrant wheels.
Be it known that I Benjamin Franklin Adams
of Boston in the County of Suffolk & State of Massachusetts
have made an improvement in the useful arts, being an
apparatus for steering vessels called Adams' Steering horizontal
quadrant wheels which is described as follows: reference being
had to the annexed drawing. The steering apparatus con
sists of the following principle parts. The rudders with the wheel
ropes and blocks. the steering horizontal wheels working on an
arbor. the steering quadrant. For double steam and horse-
boats I use two rudders A.A. instead of one placed paral-
lel and side by side at the stern of the vessel. Each of these
rudders need only be of about half the area or superficies
of the common rudder. I will have much more power to turn
the vessel, yet not impede its head way more than one
half, for the impeding of the vessels head-way is as the
cubes of the areas of each rudder taken separately. A rocker
B. is fixed on the head C. of the rudder to prevent the [illegible]
[illegible] wearing out. In any convenient part of the vessel place
uprights E.E. with a cross piece F. to receive an arbor G.
upon which the horizontal steering wheels turn. There are three
horizontal steering wheels H.H.H. placed upon the before
mentioned arbor, each having a groove in its periphery
to receive a chain or a band. In the upper and lower
wheels are fixed any convenient number of pins I. pointing
towards the centre wheel. In the centre wheel are openings
make 7782x Nov. 19, 1833 made to receive these pins. by means of which pins in the upper and lower wheels and the holes in the centre wheel, the wheels are united or disengaged and the vessel steered in different directions. A steering quadrant K made of wood or metal, having a groove in its rim is suspended and turns on a pin between an upright L. having a slot or opening in it the steering ropes, chains or bands M pas-sing round the steering horizontal wheels is fastened in the groove of the quadrant. Six handles for steering are fixed on the periphery of the quadrant { Operation } One or two hands being placed at the steering quadrant steer the vessel in the usual way say in a direct course.. When it is required to go in a contrary direction or backward then the centre wheel is attached to the upper wheel by pins and holes and sliding up and down the arbor, this enables the steers man to go in a contrary direction What I claim as my invention and desire to be secured by Letters Patent is the before described horizontal steering wheels by which the direction of a ves-sel can be changed by the shifting wheels. and the quad-rant for steering the vessel Witnesses
Wm P. Elliot
Saml P. Walker Jr Benjamin Franklin Adams Dr in portfolio Exd
HJL

[52 [illegible]